Feb. 4, 1947.  C. D. PETERSON ET AL  2,415,393
BALKING CLUTCH
Filed Sept. 27, 1944
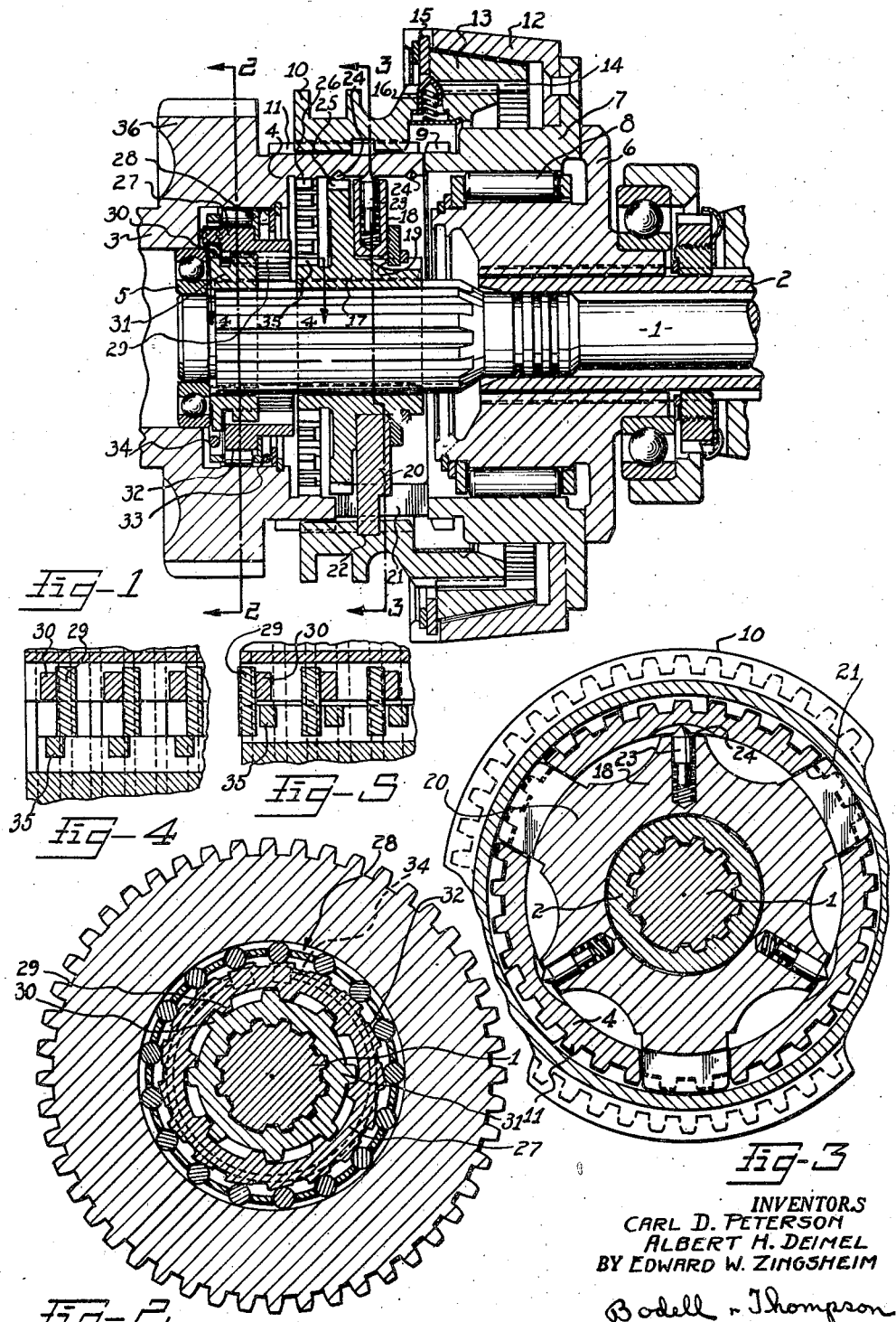
INVENTORS
CARL D. PETERSON
ALBERT H. DEIMEL
BY EDWARD W. ZINGSHEIM
Bodell & Thompson
ATTORNEYS

UNITED STATES PATENT OFFICE 2,415,393

BALKING CLUTCH

Carl D. Peterson, Albert H. Deimel, and Edward W. Zingsheim, Toledo, Ohio; Marion E. Peterson, Toledo, Ohio, executrix of said Carl D. Peterson, deceased Application September 27, 1944, Serial No. 556,024

2 Claims. (Cl. 192—53)

This invention relates to balking clutches. Heretofore, balking clutches included a balking ring which had a friction surface for coacting with the complemental friction surface, with only enough friction to control the locking or balking movement and the unlocking movement of the balking ring, and without transmitting appreciable torque.

The invention has for its object a frictionless balking clutch in which the balking member or ring is not controlled by friction between friction surfaces but is controlled by the dragging effect due to the differential speeds of a ratio from which and into which the shift is being made, the dragging effect being through a one-way clutch which permits, for instance, a part being driven in the lower speed ratio to shift the balk ring out of normal balk position when said part is temporarily rotating faster than the balk ring, which, in this instance, is rotating in the high speed ratio, and in so doing, effecting crossing of the speeds of the two parts to be clutched together by the balk clutch. The crossing of the speeds may be brought about by temporarily decelerating the drive member. The clutch may be so made that the reverse of this operation takes place, that is, the balk ring operated by accelerating the driven member.

In the illustrated embodiment of this balk clutch, the high speed drive is a direct drive and the lower speed is through an indirect drive, although this order may be reversed. The indirect drive may be a high speed or overdrive, and the one-way clutch controlling the balk ring correspondingly reversed to conform to this change. This one-way clutch is here shown as a roller clutch and the balk ring as one race, as the inner race of the roller clutch, and hence the cams of the race will be inclined in one direction, when the high speed is the direct drive, and in the other direction, when the high speed is the indirect drive.

The invention consists in the novel features and in the combinations and constructions hereinafter set forth and claimed.

In describing this invention, reference is had to the accompanying drawing in which like characters designate corresponding parts in all the views.

Figure 1 is a longitudinal sectional view of a transmission mechanism embodying this balking clutch, adjacent parts of the transmission gearing being also shown.

Figures 2 and 3 are sectional views taken respectively on lines 2—2 and 3—3, Figure 1.

Figures 4 and 5 are diagrammatic views on the plane of line 4—4, Figure 1, illustrating the locking and the unlocking action of the balk member or ring of the clutch.

The transmission mechanism in which this clutch is embodied comprises, generally, a driven shaft selectively actuatable through different direct and indirect speed ratios, a direct drive shaft and an indirect drive shaft, a balk clutch for connecting one drive shaft and the driven shaft through one speed ratio including an axially shiftable toothed member rotatable with one of the shafts to be clutched together, and a balk ring rotatable with the shiftable member and having a limited arcuate rocking movement relative thereto, the ring being provided with balk teeth, the shiftable member having balk teeth normally opposed to the balk teeth of the ring when the ring is in its normal position at one end of the arc of rocking movement, spring means biasing the balk ring in one direction to its normal or blocking position, means for transmitting the motion of the other of said shafts to be clutched together to the balk ring in the opposite direction only, to rock the same out of blocking position, when the speeds of these two shafts are differential and preliminary to shifting in the balk clutch, and the other of said shafts is rotating relatively to said one shaft in said opposite direction, so that due to the differential speeds, the balk ring is rocked against the action of its spring in said opposite direction, and hence permits the balk ring and the shaft with which it rotates to run free in said one direction, when the balk clutch is disengaged. A stop is provided for limiting the arcuate movement of the balk ring out of its blocking position. The balk clutch hence operates for a shift in one direction or shifts only in one direction out of balking position in contradistinction to in opposite directions to a central position in which it is in unbalking or unlocking position.

In the transmission mechanism here illustrated, as embodying this balk clutch, the lower speed is through an indirect drive but the drive shafts may be actuated in any suitable manner. The indirect drive shaft may be actuated through a hydraulic torque converter, as in the application of Carl D. Peterson and Albert H. Deimel, Serial No. 497,839, filed August 7, 1943, now Patent No. 2,397,883, in which the indirect drive is through a sleeve encircling the direct drive shaft, this sleeve being the elongated hub of the turbine wheel or runner of the torque converter. However, in so far as this clutch is concerned, the indirect drive shaft may be arranged and actuated in any suitable manner and may be actuated through gearing other than a hydraulic converter.

1 and 2 designate respectively direct drive and indirect drive shafts, and 3 the driven element or shaft. The indirect drive shaft 2 is a sleeve or elongated hub enclosing the drive shaft 1. The drive shaft 1 is actuated directly by the prime mover or engine, while the shaft 2 may be actuated, as shown, in the pending application referred to, through a torque converter mounted concentric with the shaft 1. The runner or turbine wheel of the converter is mounted on the shaft or sleeve 2, or the shaft or sleeve 2 is an elongation of the hub of the turbine wheel, the drive from the converter shaft 2 being controlled through a synchronizing clutch and direct drive from the shaft 1 is controlled by the balking clutch forming the subject matter of this invention.

In the transmission construction in which this invention is embodied, the driven element or shaft 3 is provided with a hollow cylindrical head 4 into which the end of the drive shaft 1 extends beyond the end of the sleeve of the shaft 2, the shaft 1 having a bearing, as 5, at its end in the driven element 3. The sleeve or drive shaft 2 is provided with a head 6 keyed or splined thereon opposed to the head 4.

7 designates a cylindrical ring surrounding the head 6 and journalled thereon through an overrunning roller clutch 8, this ring 7 being the body of the synchronizing clutch and being opposed to the head 6 and having peripheral clutch teeth 9 for coacting with internal clutch teeth on a shiftable clutch collar 10 slidably splined on peripheral teeth 11 on the head 4.

12 designates a friction ring of the synchronizing clutch, this being secured to the ring 7 in any suitable manner. 13 designates a complemental friction ring slidably splined at 14 on an extension of the clutch collar 10 into the friction ring 12, it being held from dislocation axially by retaining means 15 of any suitable construction. As is well known, synchronizing rings, as 13, have a rocking movement to aline the internal clutch teeth of the collar 10 and the external clutch teeth 9 when the speeds synchronize.

Yielding means is provided between the shifting collar 10 and the synchronizing ring 13 to cause them to shift as a unit in the usual way, when the shifting-in force is applied and until the axial shifting in of the synchronizing ring 13 is stopped, by reason of the engagement of its friction surface with that of the ring 12, and then, as the speeds approach synchronization, to permit shifting of the collar 10 axially relatively to the synchronizing ring 13, to engage the internal clutch teeth thereof with the clutch teeth 9. The yielding means, as here shown, consists of the well-known, spring-pressed poppets 16. The construction of this synchronizer or synchronizing clutch per se forms no part of this invention.

The balking clutch, which forms the subject matter of this invention, is located within the head 4, is also operated by the shifting collar 10, and includes a member 17 slidably splined on the shaft 1, within the head 4, and shiftable in opposite directions from neutral position, the shifting in one direction, as to the right, Figure 1, being an idling one only, while the shifting collar 10 is being operated to the right to engage the synchronizing clutch. The member 17 is shown as connected to the collar 10, as through a spider 18, mounted in a groove 19 in the hub of the member 17 and having radially extending arms 20, which extend through slots 21 in the wall of the head 11 and into an internal groove at 22 in the collar 10. The member 17 is located in its neutral and shifted positions by means of spring-pressed poppets 23 mounted in suitable radial bores in the spider 18 between the arms 20, these poppets coacting with suitable notches 24 in the inner wall of the cylindrical head 4.

The member 17 is provided with peripheral clutch teeth 25 and is shiftable into interlocking engagement with internal clutch teeth 26 in the head 4 near the bottom of the recess thereof. The balking clutch forming the subject matter of this invention operates to block engagement of these clutch teeth until the speeds of the two parts to be clutched together cross.

The balking means comprises a balk ring 27 journalled in the driven member 3 or a recess at the inner end of the cylindrical head 4 through a one-way or overrunning clutch 28 and connected to the shaft 1 to rotate therewith but to have a limiting rocking circumferential movement, it being here shown as having internal teeth 29 extending between the external teeth 30 on a collar 31 splined on the shaft 1, the ring 27 having peripheral cams 32 which coact with the rollers of the overrunning clutch 28 in the usual manner. The overrunning clutch also includes a suitable cage for the rollers. The cage is acted upon by a spring, as 33, which biases the same in such a direction as to carry the rollers up to the higher points of the cams, as is well understood. The balking ring 27 is also biased by a similar spring 34, which tends to move and turn the cam or balking ring 27 in such direction as to move and normally hold the ring in blocking position. The shiftable clutch member 17 of the balk ring is also formed with blocking teeth 35 normally arranged opposed to the ends of the teeth 29, as seen in Figure 4, and hence block shifting in of the balk member 17 to engage the clutch teeth 25 with the clutch teeth 26. In order to get the teeth out of blocking engagement, the balk ring 27 is shifted into the position shown in Figure 5 to permit the teeth 35 to enter between the internal teeth 29 of the balk ring 27. As before stated, this was effected heretofore by friction surfaces between the balk ring and the ring on the other of the parts to be clutched together by the balking clutch. However, in this balking ring clutch, the balk ring 27 has no friction surface, but the shifting of the balk ring to bring the teeth 35 and 29 out of blocking position is effected by varying the relative speeds of the two parts to be clutched, so that as the speeds cross the balk ring is rocked by the back action of the overrunning clutch to unlocking position. As the direct drive is the high speed drive, this is effected by decelerating shaft 1 to a speed slower than that of the driven member 3. The crossing of the speeds, the slowing down or deceleration of the shaft 1, after the speeds are synchronized or when they cross or just after they cross, causes the driven member 3 to drive the balking ring 27 or now rock it faster than the decelerating shaft 1, moving the teeth 29 out of position to block the teeth 35 or from the position shown in Figure 4 to that shown in Figure 5, thus permitting shifting in of the clutch teeth 25 and 26. This blocking action can not occur until the driven member 3 becomes the driver through the overrunning clutch for the decelerating drive shaft 1. The deceleration is effected by throttling the engine. The braking effact of the converter or other indirect drive causes a quick momentary deceleration, and hence permits a quick shift of the balk clutch.

The balking ring 27 is arranged relatively to the sleeve 31, as seen in Figure 2, wherein the blocking shoulders 29 are at the start of their arc of movement and in blocking position shown in Figure 4. When the shift is to be made and the collar 10 shifted to the left to shift out the synchronizing clutch, the shaft 3 and its head 4 will rotate under the momentum of the vehicle and the shaft 1 and sleeve 31 thereon will slow down while the engine is decelerating, thus in effect, causing the outer race to pick up the inner race or cam or balking ring 27 and rotate it faster than the sleeve 31, thus moving the shoulders 29 clockwise away from the shoulders 30 against the action of the spring 34. Owing to the small angle of the cams of the inner race or balking ring 27 and the high wedging force required, there is considerable movement before the rollers pick up or wedge with the cams to shift the inner race or balk ring to unlock it against the action of the spring 34, which is not strong enough to transmit torque. Hence at the time the rollers pick up the cams of the balking ring 27, the shaft 1 is running slower than the coasting shaft 3 and head 4 or outer race of the overrunning clutch, or the speeds cross, so that the internal shoulders 29 of the balking ring have moved from the position shown in Figures 2 and 4 to the right toward or into the positions indicated in Figure 5, and the blocking shoulders 35 on the jaw section 17 of the clutch are free to move out of blocking position shown in Figure 4 toward the position shown in Figure 5, letting the clutch teeth 25 interlock with the clutch teeth 26.

In operation, assuming that the clutch collar 10 has been shifted to the right and the synchronizer clutch is engaged or the drive is from the sleeve or driven shaft 2 to the driven member 3 and that a shift is to be made into direct drive to connect the drive shaft and the driven shaft 3 directly together through the balking clutch, at this time, the vehicle in which the transmission is installed has assumedly developed a speed up to the direct drive or high speed range. These shifts are usually automatically determined by an output speed governor and the shifting effected by power, although when the speed range is reached, the operator wills the shift by operating the accelerator pedal to decelerate the engine, as for instance, as set forth in application of Carl D. Peterson and Albert H. Deimel, Serial No. 499,512, filed August 21, 1943, now Patent No. 2,399,567. When this speed range is reached, the collar 10 is shifted to neutral position, but the shifting to the left to shift in the balk clutch is obstructed, while the speeds of the shafts 1 and 3 are different. Deceleration of the engine decelerates or causes the shaft 1 to slow down to a lower speed than the driven shaft 3, which is being actuated under its momentum and without retardation after the synchronizing clutch has been disengaged. Deceleration of the engine slows down the shaft 1 which normally rotates faster, below that of the driven element 3 under this momentum, and thus causes the driven member 3 through the overrunning clutch 28 to control and time the rocking movement of the balk ring 27, so that the balking teeth 35 and 29 do not come out of abutting relation until the speed of the shaft 1 is slightly below that of the shaft 3. When this unblocking takes place, obviously the shifting in of the member 17 to engage the clutch teeth 25, 26 can take place without clashing.

What we claim is:

1. In a transmission mechanism, the combination of driving and driven shafts, one of the shafts having a head formed with an axial cylindrical recess and the other extending coaxially into the recess and spaced from the inner annular wall of the recess, a balking ring clutch located in the recess and operable to clutch the shafts together, including an axially shiftable member splined on said other of the shafts, a collar splined on said other of the shafts, a balking ring mounted on the collar to have a limited rocking movement, an overrunning clutch between the balking ring and the head of said one of the shafts, the balking ring being the inner race of the overrunning clutch, the balking ring having a limited rocking movement forward relatively to the drive shaft, the ring and the axially shiftable member having balking teeth located to abut when the speeds of the two shafts are different, a spring acting on the balking ring tending to shift it to balking position, and a shifting collar on the head connected to the shiftable member to shift it, all whereby the drive shaft overruns the driven shaft when the speed of the drive shaft is greater than that of the driven shaft and the clutch is disengaged, and the driven shaft operates to shift the balking ring out of balking position when the drive shaft is decelerated to a point where the driven shaft momentarily rocks the balking ring faster than the drive shaft rotates.

2. In a transmission mechanism, the combination of driving and driven shafts, one of the shafts having a head formed with an axial cylindrical recess, the wall of which serves as the outer race of an overrunning clutch, the other shaft extending coaxially into the recess, a sliding toothed clutch section splined on said other shaft and having a hub provided with blocking teeth, a collar splined on said other shaft adjacent the bottom of said recess, a balking ring mounted on the collar to have a limited rocking movement and forming the inner race of the overrunning clutch, said balking ring having blocking teeth against which the blocking teeth on the sliding clutch section are adapted to abut when in blocking position, the overrunning clutch permitting the drive shaft to overrun the driven shaft and the driven shaft to have a rocking movement in a forward direction, upon deceleration of the drive shaft to a slower speed than the driven shaft when the clutch is disengaged, spring means for biasing the balking ring into blocking position, rollers between the inner and outer races to lock said balking ring to the driven shaft to rock the balking ring out of blocking position upon deceleration of the drive shaft to a speed less than that of the driven shaft, and a collar slidable on the head and connected to the shiftable clutch section to shift the same when said balking ring is out of blocking position.

CARL D. PETERSON.
ALBERT H. DEIMEL.
EDWARD W. ZINGSHEIM.

REFERENCES CITED

The following references are of record in the file of this patent:

UNITED STATES PATENTS

| Number | Name | Date |
| --- | --- | --- |
| 2,333,668 | Neracher et al. | Nov. 9, 1943 |
| 2,041,445 | Warren | May 19, 1936 |
| 2,071,582 | Salerni | Feb. 23, 1937 |